United States Patent
Fukuda et al.

(10) Patent No.: US 11,215,293 B2
(45) Date of Patent: Jan. 4, 2022

(54) ELECTROMAGNETIC VALVE

(71) Applicant: ADVICS CO., LTD., Kariya (JP)

(72) Inventors: Junichi Fukuda, Aichi-ken (JP); Koichi Hashida, Kariya (JP); Hidenori Hayakawa, Anjo (JP)

(73) Assignee: ADVICS CO., LTD., Kariya (JP)

( * ) Notice: Subject to any disclaimer, the term of this patent is extended or adjusted under 35 U.S.C. 154(b) by 0 days.

(21) Appl. No.: 16/648,763

(22) PCT Filed: Sep. 21, 2018

(86) PCT No.: PCT/JP2018/035222
§ 371 (c)(1),
(2) Date: Mar. 19, 2020

(87) PCT Pub. No.: WO2019/059385
PCT Pub. Date: Mar. 28, 2019

(65) Prior Publication Data
US 2020/0248829 A1    Aug. 6, 2020

(30) Foreign Application Priority Data
Sep. 21, 2017 (JP) .............................. JP2017-181602

(51) Int. Cl.
*F16K 31/06* (2006.01)
*F04B 53/10* (2006.01)
(Continued)

(52) U.S. Cl.
CPC .......... *F16K 31/0675* (2013.01); *F04B 53/10* (2013.01); *H01F 7/13* (2013.01);
(Continued)

(58) Field of Classification Search
CPC ............. F16K 31/0658; F16K 31/0675; F16K 31/0693; H01F 7/13; H01F 7/16;
(Continued)

(56) References Cited

U.S. PATENT DOCUMENTS 4,290,039 A * 9/1981 Tochizawa ................ H01F 7/10
335/251
5,586,747 A * 12/1996 Bennardo ........... F16K 31/0658
251/129.18

(Continued)

FOREIGN PATENT DOCUMENTS

EP    2975266 A1    1/2016
JP    2005098340 A    4/2005

(Continued)

OTHER PUBLICATIONS

International Search Report (with English Translation) and Written Opinion issued in corresponding International Patent Application No. PCT/JP2018/035222, 11 pages (dated Dec. 4, 2018).

*Primary Examiner* — Matthew W Jellett
(74) *Attorney, Agent, or Firm* — Buchanan Ingersoll & Rooney PC (57) ABSTRACT

A yoke is provided with a notch, notched from two points P1 and P2 on a circumference forming a sleeve-side insertion hole toward the outside of the circumference, the notch having a minimum distance between the points P1 and P2 as a width W and the distance from a straight line linking the points P1 and P2 in a direction orthogonal to the straight line as a length L. The width W of the notch is set on the basis of a target attraction force for attracting a plunger, the attraction force increasing with an increase in the width W, and the length L of the notch is greater than or equal to a prescribed length Ld where the attraction force increasing with an increase in the length L becomes constant at the target attraction force in the set width W irrespective of an increase in the length L.

6 Claims, 5 Drawing Sheets

(51) Int. Cl.
*H01F 7/13* (2006.01)
*H01F 7/08* (2006.01)
*H01F 7/16* (2006.01)

(52) U.S. Cl.
CPC .. *H01F 2007/083* (2013.01); *H01F 2007/085* (2013.01); *H01F 2007/1676* (2013.01)

(58) Field of Classification Search
CPC ......... H01F 2007/083; H01F 2007/085; H01F 2007/1676
USPC ....... 251/129.07, 129.15; 335/236, 271, 274, 335/281
See application file for complete search history.

(56) References Cited

U.S. PATENT DOCUMENTS

| | | | | |
|---|---|---|---|---|
| 6,601,822 B2 * | 8/2003 | Tachibana | ........... | F16K 31/0613 137/625.69 |
| 6,659,421 B1 * | 12/2003 | Goossens | ................ | B60T 8/363 251/129.02 |
| 7,246,863 B2 * | 7/2007 | Otsuka | .................. | B60T 8/3675 303/119.2 |
| 7,468,647 B2 * | 12/2008 | Ishibashi | ............. | F16K 31/0613 251/129.15 |
| 7,819,380 B2 * | 10/2010 | Sugiyama | ............. | H01F 7/1607 251/129.21 |
| 8,134,436 B2 * | 3/2012 | Yasoshima | .............. | H01F 7/128 335/220 |
| 8,757,587 B2 * | 6/2014 | Miura | ................. | F16K 31/0658 251/129.15 |
| 2002/0175791 A1 * | 11/2002 | LaMarca | ............ | H01F 7/128 335/220 |
| 2014/0145100 A1 * | 5/2014 | Ishibashi | ........... | F02M 21/0215 251/129.15 |

FOREIGN PATENT DOCUMENTS

JP      2015040624 A      3/2015
JP      2016029270 A      3/2016

* cited by examiner

ELECTROMAGNETIC VALVE

TECHNICAL FIELD

The present invention relates to an electromagnetic valve.

BACKGROUND ART

A control valve disclosed in the following Patent Literature 1, for example, is conventionally known. This conventional control valve includes a solenoid that is energization controlled by a PWM method to generate a magnetic attraction force for driving a valve element in a valve closing direction. The solenoid includes a bobbin, a coil wound around the bobbin, a core fixed to the body coaxially with the bobbin, a plunger that is arranged facing the core along an axis direction on the inner side of the bobbin and that integrally displaces with a transmission rod, a yoke that is provided to surround the coil together with the core and the plunger and that forms a magnetic circuit when the coil is energized, and a concave shaped notch having structural portion that is asymmetric to the axis of the bobbin and being formed on an inner peripheral surface of a collar as an asymmetric structure that biases the balance of the magnetic attraction force in the radial direction acting on the plunger toward one side. In the conventional control valve, the noise due to the minute vibration of the plunger is suppressed by biasing the balance of the magnetic attraction force toward one side.

CITATIONS LIST

Patent Literature

Patent Literature 1: Japanese Unexamined Patent Application Publication No. 2016-29270

SUMMARY OF INVENTION

Technical Problems

In the conventional control valve described above, the strong and weak of a magnetic attraction force is generated in a direction along the circumferential direction of the plunger (movable element) by providing a concave shaped notch in the collar, thus generating an attraction force for attracting the movable element in the radial direction. However, in the conventional control valve described above, the notch formed in the collar is not specified at all in terms of the width and length of the concave shape, where the attraction force for attracting the movable element to one side with respect to the axis becomes insufficient if the width and the length of the notch are small. As a result, the movable element cannot be attracted in the radial direction by the attraction force, and the sliding resistance when the movable element operates becomes insufficient, making it difficult to suppress noise due to minute vibration.

The present invention has been contrived to solve the above-described problem. That is, an object of the present invention is to provide an electromagnetic valve that reliably generates an attraction force for attracting a movable element to one side with respect to an axis and suppresses generation of abnormal noise at the time of operation.

Solutions to Problems

In order to solve the problems described above, the invention of an electromagnetic valve according to claim 1 includes a tubular sleeve; a tubular valve body with an inflow hole liquid-tightly fixed at one end side of the sleeve and through which the fluid flow in and an outflow hole through which the fluid flows out; a stator liquid-tightly fixed at the other end side of the sleeve; a movable element that is arranged between the stator and the valve body inside the sleeve and that moves along an axis of the sleeve; an urging member that urges the movable element along the axis; a seat member that is fixed inside the valve body and that includes a valve seat and a valve hole communicating with the valve seat; a valve element that moves along the axis integrally with the movable element to be seated and separated with respect to the valve seat; a coil provided on the outer periphery of the sleeve; and a yoke with a first insertion hole for inserting the stator and a second insertion hole coaxial with the first insertion hole for inserting the sleeve, the yoke being provided to surround the coil and to form a magnetic circuit together with the stator and the movable element when the coil is energized; where the yoke includes a notch formed by being notched to the outside of a circumference from two points on the circumference forming at least one insertion hole of the first insertion hole and the second insertion hole, and that has a minimum distance between the two points as a width and a distance from a straight line connecting the two points in a direction orthogonal to the straight line as a length; the width of the notch is set based on a target attraction force of an attraction force that increases as the attraction force width increases, the attraction force width being for attracting the movable element toward an inner peripheral surface of the sleeve with the valve element in a direction opposite to a position where the notch is formed with respect to the axis when the coil is energized; and the length of the notch is set to be greater than or equal to a predetermined length so that the attraction force that increases as the length increases in the set width, becomes constant at the target attraction force regardless of the increase in the length.

Thus, the width of the notch can be determined according to the target attraction force required to attract the movable element toward the inner peripheral surface of the sleeve in a direction opposite to the position where the notch is formed, that is, to attract the movable element to one side with respect to the axis, and the length of the notch can be determined to be greater than or equal to a predetermined length which is determined according to the determined width. With the notch having the determined width and length formed in the yoke, an attraction force that matches the target attraction force when the coil is energized can be reliably generated, and the movable element can be attracted to one side with respect to the axis. Therefore, when the electromagnetic valve is operated accompanying the energization of the coil, the movable element is pressed against the inner peripheral surface of the sleeve, so that the generation of vibration (self-excited vibration) of the movable element and the valve element can be satisfactorily suppressed and the generation of abnormal noise during the operation of the electromagnetic valve can be greatly reduced.

DESCRIPTION OF EMBODIMENT

Hereinafter, an embodiment of the present invention will be described with reference to the drawings. In the following embodiments and modified examples, the same or equivalent parts are denoted by the same reference numerals in the drawings. Each figure used for the description is conceptual, and the shape of each portion is not necessarily exact in some cases.

Figure 1:
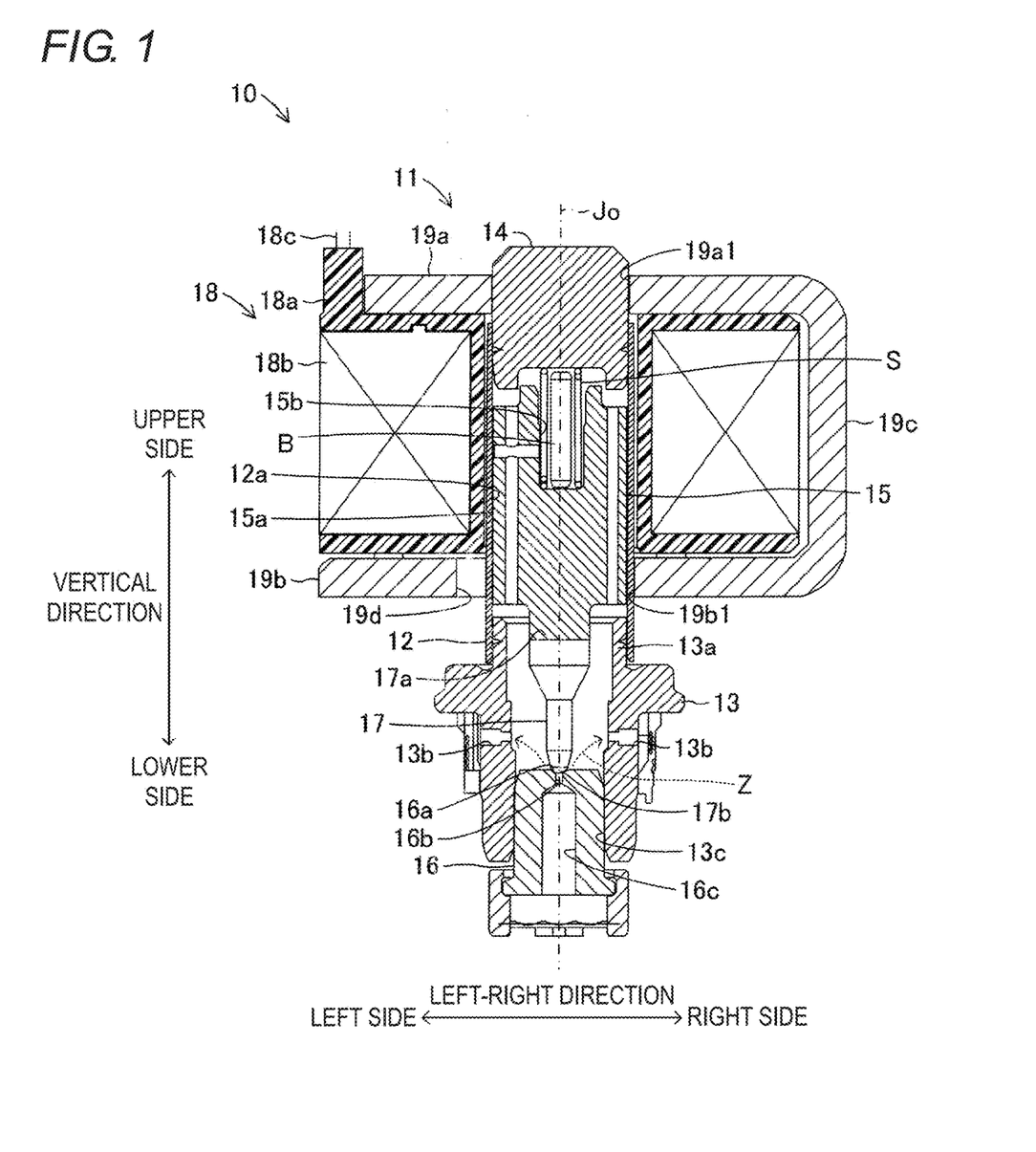
FIG. 1 is a cross-sectional view showing an embodiment of an electromagnetic valve according to the present invention.

As shown in FIG. 1, an electromagnetic valve 10 of the present embodiment is a normally-closed type electromagnetic valve that opens at the time of energization (communicating state) and closes at the time of non-energization (cutoff state). The electromagnetic valve 10 has a tubular housing 11. The housing 11 is configured by a tubular sleeve 12, and a tubular valve body 13 liquid-tightly fixed to one end side (lower side in the vertical direction in FIG. 1) of the sleeve 12.

The sleeve 12 is formed from a non-magnetic material. A stator 14 is fixed to the other end side (upper side in the vertical direction in FIG. 1) of the sleeve 12 in a liquid-tight manner. The stator 14 is formed in a column shape from a magnetic material. Furthermore, the sleeve 12 accommodates therein a plunger 15 serving as a movable element that is disposed between the stator 14 and the valve body 13 and that moves along the axis Jo of the housing 11, that is, the sleeve 12. On the side of the stator 14 (lower side in the vertical direction in FIG. 1) opposing the plunger 15, a stopper pin SP is provided that abuts against the proximate plunger 15 and restricts the movement of the plunger 15.

The plunger 15 is formed in a column shape from a magnetic material, where an outer peripheral surface 15a of the plunger 15 has an outer diameter slightly smaller than an inner diameter of the inner peripheral surface 12a of the sleeve 12. Thus, there is a clearance between the inner peripheral surface 12a of the sleeve 12 and the outer peripheral surface 15a of the plunger 15, and as will be described later, the plunger 15 is movable along the radial direction (left-right direction in FIG. 1) of the sleeve 12.

Furthermore, the sleeve 12 accommodates a spring S serving as an urging member that is assembled in a compressed state between the stator 14 and the plunger 15, and that urges the plunger 15 along the axis Jo of the sleeve 12 (i.e., the housing 11). More specifically, the spring S is accommodated inside an accommodation hole 15b provided on one end side (upper side in the vertical direction in FIG. 1) of the plunger 15. Thus, the plunger 15 is urged toward the valve body 13 along the axis Jo of the sleeve 12 by the urging force of the spring S.

As shown in FIG. 1, the valve body 13 is formed in a tubular shape extending along the axis Jo from the magnetic material. An annular protrusion 13a is formed at one end side (upper side in the vertical direction in FIG. 1) of the valve body 13, and is inserted into one end side (lower side in the vertical direction in FIG. 1) of the sleeve 12 to be liquid-tightly fixed thereto. Furthermore, a pair of (in the left-right direction in FIG. 1) outflow holes 13b through which the fluid flows out are provided in a central portion of the valve body 13. Moreover, a seat member 16 is liquid-tightly fixed to an inflow hole 13c (lower side in the vertical direction in FIG. 1) through which the fluid of the valve body 13 flows in.

The seat member 16 is formed in a column shape from a non-magnetic material. As shown in FIG. 1, the seat member 16 is formed with a valve seat 16a, a valve hole 16b, and an inflow passage 16c so as to be coaxial with the axis Jo. The valve seat 16a can abut against (seated or separated) a valve element 17, described later, that moves integrally with the plunger 15. The valve seat 16a is formed in a conical shape having a conical surface whose cross-sectional shape along the axis Jo becomes concave toward the valve element 17. Thus, when the valve element 17 is seated on the valve seat 16a, the valve element 17 and the valve seat 16a are aligned so that the axes thereof coincide with each other.

When the valve element 17 is separated from the valve seat 16a, the valve hole 16b in the present embodiment flows the fluid flowing in from the inflow passage 16c to the outflow hole 13b of the valve body 13 through a flow passage Z indicated by a broken line in FIG. 1. As shown in FIG. 1, the inner diameter of the valve hole 16b is smaller than the inner diameter of the inflow hole 13c and the inner diameter of the inflow passage 16c.

As shown in FIG. 1, the valve element 17 is formed to have a spherical surface projecting out in the direction of the axis Jo from the non-magnetic material. The valve element 17 has a proximal end portion 17a fixed to the other surface side (lower side in the vertical direction in FIG. 1) of the plunger 15, and is configured to move integrally with the plunger 15 along the direction of the axis Jo. A distal end portion 17b of the valve element 17 is formed in a spherical shape and is seated or separated with respect to the valve seat 16a having a conical surface. The electromagnetic valve 10 according to the present embodiment is a normally-closed type electromagnetic valve in which the valve element 17 (distal end portion 17b) is seated on the valve seat 16a of the seat member 16 when the coil 18 is not energized.

A coil 18 is provided on the outer periphery of the sleeve 12. The coil 18 is configured by winding a copper wire 18b around a bobbin 18a. The coil 18 includes a coil terminal 18c that supplies power to the copper wire 18b. A yoke 19 is provided on the outer periphery of the coil 18 so as to surround the coil 18 and form a magnetic circuit together with the stator 14 and the plunger 15 when the coil 18 is energized.

Figure 2:
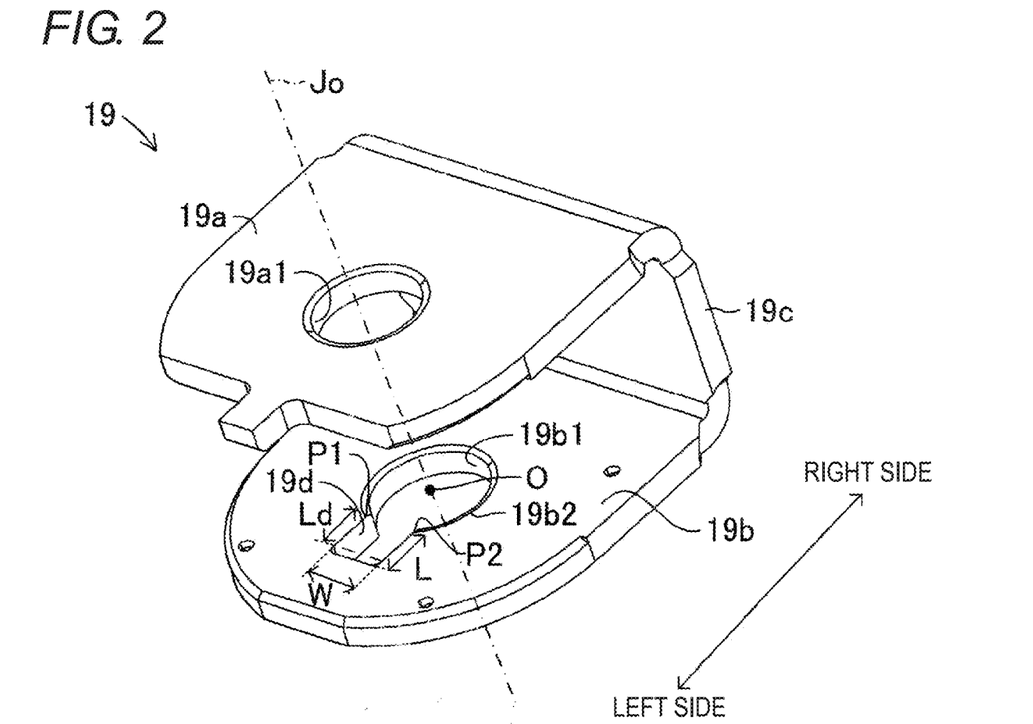
FIG. 2 is a perspective view of a yoke shown in FIG. 1.

As shown in FIGS. 1 and 2, the yoke 19 of the present embodiment includes a plate-shaped first member 19a and a plate-shaped second member 19b that are orthogonal to the direction of the axis Jo and are parallel to each other, and a third member 19c that is parallel to the direction of the axis Jo and that connects one end side which is a part of the first member 19a and a part of the second member 19b. That is, as shown in FIGS. 1 and 2, the yoke 19 of the present embodiment is formed in a U-shape including the third member 19c. In the first member 19a, a stator-side insertion hole 19a1 serving as a first insertion hole through which the stator 14 is inserted is formed. In the second member 19b, a sleeve-side insertion hole 19b1 serving as a second insertion hole through which the sleeve 12 is inserted is formed. The stator-side insertion hole 19a1 and the sleeve-side insertion hole 19b1 are coaxial along the direction of the axis Jo.

Figure 3:
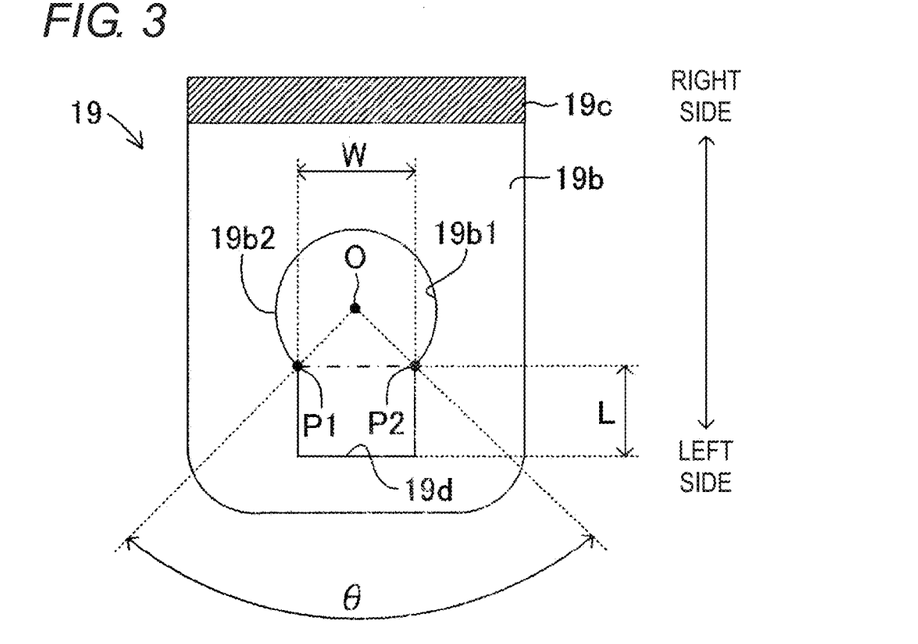
FIG. 3 is a partial cross-sectional view showing a configuration of a notch in FIG. 2.

In the present embodiment, as shown in FIGS. 1 to 3, the yoke 19 includes a notch 19*d* formed in the sleeve-side insertion hole 19*b*1 which is the side proximate to the valve element 17 accommodated inside the sleeve 12 among the stator-side insertion hole 19*a*1 and the sleeve-side insertion hole 19*b*1. As shown in FIGS. 2 and 3, the notch 19*d* is formed by being notched and extended to the outside of the circumference 19*b*2 from two points P1 and P2, which are on the circumference 19*b*2 forming the sleeve-side insertion hole 19*b*1 (direction away from the center point O of the sleeve-side insertion hole 19*b*1, and the left direction in the left-right direction in a state where the yoke 19 is assembled to the sleeve 12 in the present embodiment). Thus, in the present embodiment, as shown in FIG. 1, the third member 19*c* is arranged on the right side in the left-right direction in a state where the yoke 19 is assembled to the sleeve 12, so that the notch 19*d* is provided on the side opposite to the third member 19*c* with respect to the axis Jo.

Figure 4:
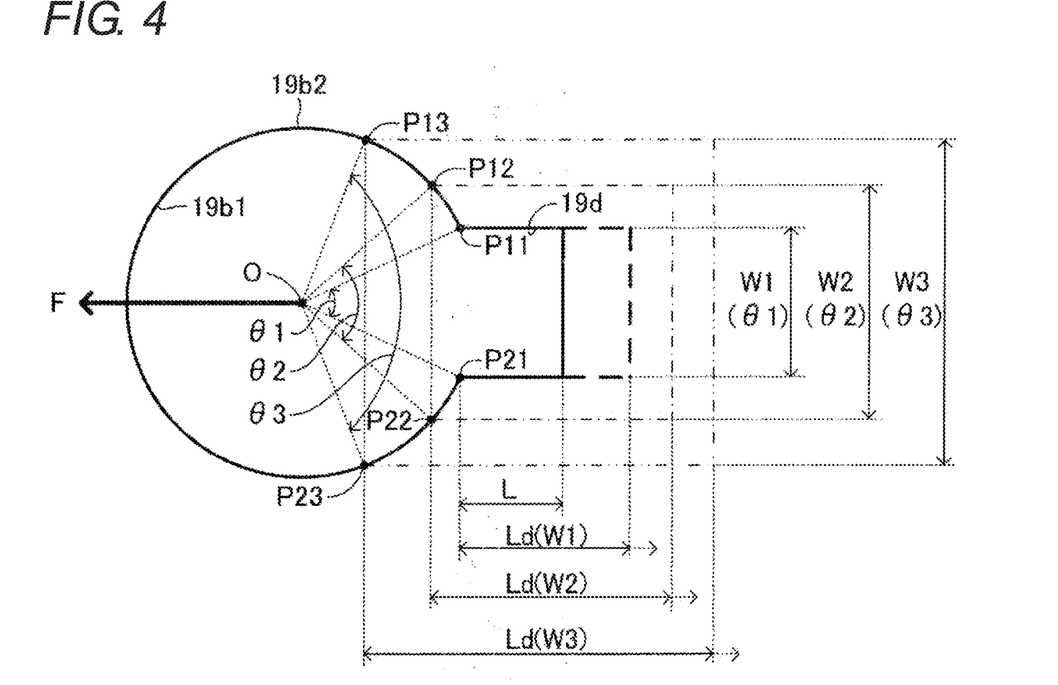
FIG. 4 is a view for explaining a width and a length forming the notch in FIG. 3.
Figure 5:
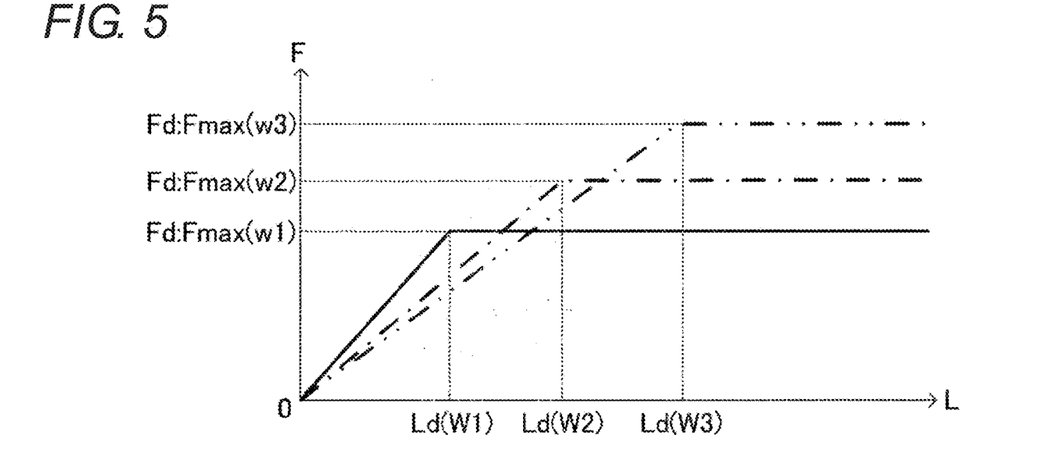
FIG. 5 is a view showing a relationship between the width and length and a target attraction force.

As specifically shown in FIG. 3, the notch 19*d* has a minimum distance between two points P1 and P2 (corresponding to the length of a straight line connecting the points P1 and P2) as the width W. As shown in FIGS. 4 and 5, the width W of the notch 19*d* is set based on the target attraction force Fd for attracting the plunger 15 for the attraction force F that increases as the width W increases. Furthermore, as specifically shown in FIG. 3, the notch 19*d* has a distance from the straight line connecting the two points P1 and P2 in a direction orthogonal to the straight line as the length L. As shown in FIGS. 4 and 5, the length L of the notch 19*d* is set so as to be greater than or equal to a predetermined length Ld, at which the attraction force F that increases as the length L increases in the set width W becomes constant at the target attraction force Fd regardless of increase in the length L. Hereinafter, the setting of the width W and the length L of the notch 19*d* will be described in detail.

In the electromagnetic valve 10, fluid is supplied from the inflow passage 16*c* of the seat member 16. In the electromagnetic valve 10, when the coil 18 is not energized, the plunger 15 is urged downward (lower side in the vertical direction in FIG. 1) along the direction of the axis Jo by the urging force of the spring S. As a result, the valve element 17 integrally fixed to the plunger 15 is also urged toward the (lower side in the vertical direction in FIG. 1) along the direction of the axis Jo, and the distal end portion 17*b* is seated on the valve seat 16*a* of the seat member 16.

On the other hand, when the coil 18 is energized, the plunger 15 is moved upward (upper side in the vertical direction in FIG. 1) along the direction of the axis Jo against the urging force of the spring S by a magnetic circuit formed with the stator 14 and the yoke 19. The valve element 17 integrally fixed to the plunger 15 thus also moves upward (upper side in the vertical direction in FIG. 1) along the direction of the axis Jo, and the distal end portion 17*b* is separated from the valve seat 16*a*. When the distal end portion 17*b* of the valve element 17 is separated from the valve seat 16*a*, the fluid flows from the valve hole 16*b* toward the outflow hole 13*b* of the valve body 13 through the flow passage Z.

Here, immediately after the valve element 17 is separated from the valve seat 16*a* or when the change in flow rate of the fluid flowing through the flow passage Z is large, the fluid force of the fluid acts on the valve element 17 and the valve element 17 vibrates in the radial direction (left-right direction in FIG. 1) of the sleeve 12, that is, self-excited vibration may occur. As opposed to the self-excited vibration, in the electromagnetic valve 10, when the coil 18 is energized, an attraction force F (target attraction force Fd) which is an electromagnetic force for attracting the plunger 15 toward the inner peripheral surface 12*a* of the sleeve 12 with the valve element 17 in a direction opposite to the position where the notch 19*d*, in which the width W and the length L are appropriately set, is formed is generated in the yoke 19. The outer peripheral surface 15*a* of the plunger 15 is thus pressed against the inner peripheral surface 12*a* of the sleeve 12, and the self-excited vibration generated in the plunger 15 and the valve element 17 is suppressed.

As described above, when the coil 18 is energized, the yoke 19 includes the plunger 15 to form a magnetic circuit. In this case, the plunger 15 is acted on by an electromagnetic force in the direction along the axis Jo, specifically, in the vertical direction attracted toward the stator 14 in the present embodiment, and also by an electromagnetic force in a direction along the radial direction of the sleeve 12 orthogonal to the axis Jo. When the notch 19*d* is not provided in the yoke 19, the electromagnetic force in the direction along the radial direction acts uniformly over the entire circumference of the plunger 15, in other words, acts in a balanced manner. Therefore, in this case, the electromagnetic forces in the direction along the radial direction act symmetrically with respect to the axis Jo, and therefore cancel each other. For this reason, when the notch 19*d* is not provided in the yoke 19, the plunger 15 and the valve element 17 do not move as no attraction force F for attracting toward the inner peripheral surface 12*a* of the sleeve 12 is generated, and move only in the direction along the axis Jo when the coil 18 is energized.

On the other hand, when the notch 19*d* is provided in the yoke 19, the electromagnetic force acting in the direction along the radial direction is inversely proportional to the distance between the plunger 15 and the sleeve-side insertion hole 19*b*1, so that strong and weak occur along the circumferential direction of the plunger 15. That is, when the notch 19*d* is provided in the yoke 19, the electromagnetic force in the direction along the radial direction become unbalanced in the circumferential direction of the plunger 15. Specifically, in the yoke 19, in the circumferential direction of the plunger 15, the electromagnetic force of the portion where the notch 19*d* is provided is smaller than the electromagnetic force of the other portion where the notch 19*d* is not provided. Therefore, in this case, the attraction force F for attracting the plunger 15 toward the inner peripheral surface 12*a* of the sleeve 12 is generated due to the difference in the electromagnetic force. Thus, when the coil 18 is energized, the plunger 15 is attracted toward the inner peripheral surface 12*a* of the sleeve 12 together with the valve element 17 to one side with respect to the axis Jo, specifically, in the direction opposite to the position where the notch 19*d* is formed by the action of the generated attraction force F.

The attraction force F generated due to the unbalance of the electromagnetic force in the direction along the radial direction depends on the size of the notch 19*d*, more specifically, the width W and the length L of the notch 19*d*. This will be specifically described below with reference to FIGS. 4 and 5.

In order to facilitate the understanding, a case where the width W of the notch 19*d* is fixed to the width W1, which is the minimum distance between the points P11 and P12, as indicated by a thick solid line in FIG. 4, is assumed. In this case, as shown by a thick long dashed line in FIG. 4, if the length L of the notch 19*d* is increased, the attraction force F uniformly increases toward the maximum value Fmax (W1), which is the target attraction force Fd, when the length L is increased to less than a predetermined length Ld (W1), as shown by a solid line in FIG. 5. On the other hand, when the length L becomes greater than or equal to the predetermined length Ld (W1), the attraction force F becomes constant at the maximum value Fmax (W1) (i.e., the target attraction force Fd) regardless of the increase in the length L. That is, between the attraction force F and the length L of the notch 19d, a relationship is established in which the attraction force F increases toward the maximum value Fmax (W1) when the length L is less than the predetermined length Ld (W1), and the attraction force F becomes constant at the maximum value Fmax (W1) when the length L is greater than or equal to the predetermined length Ld (W1).

Furthermore, as shown by a one-dot chain line in FIG. 4, when the width W of the notch 19d is set to a width W2 (minimum distance between the points P12 and P22) larger than the width W1, the maximum value Fmax (W2) which is the target attraction force Fd becomes larger than the maximum value Fmax (W1) at the width W1, and the predetermined length Ld (W2) becomes larger than a predetermined length Ld (W1) at the width W1, as shown by a one-dot chain line in FIG. 5. Moreover, as shown by a two-dot chain line in FIG. 4, when the width W of the notch 19d is set to a width W3 (minimum distance between the points P13 and P23) larger than the width W2, the maximum value Fmax (W3) which is the target attraction force Fd becomes larger than the maximum value Fmax (W2) at the width W2, and the predetermined length Ld (W3) becomes larger than a predetermined length Ld (W2) at the width W2, as shown by a two-dot chain line in FIG. 5.

Therefore, the width W is set according to the target attraction force Fd, that is, the maximum value Fmax, and the notch 19d is formed so as to have the length L greater than or equal to the predetermined length Ld determined by the width W. Thus, the yoke 19 can act an attraction force F that matches the maximum value Fmax (target attraction force Fd) on the plunger 15.

As a relationship established between the width W and the length L (more specifically, the predetermined length Ld) that determines the shape of the notch 19d, the following equation 1 is met for a ratio of the predetermined length Ld with respect to the width W (Ld/W). In the following equation 1, θ represents a central angle formed by a straight line connecting the point P1 (P11, P12, P13) and the center point O of the sleeve-side insertion hole 19b1, and a straight line connecting the point P2 (P21, P22, P23) and the center point O of the sleeve-side insertion hole 19b1, as shown in FIGS. 3 and 4. That is, the central angle θ is a parameter related to the width W.

$$Ld/W=0.12\theta+0.17 \qquad \text{Equation 1}$$

However, the central angle θ is arbitrarily set based on the target attraction force Fd so as to be an angle less than or equal to 180 degrees, that is, so that the width W becomes less than or equal to the diameter of the sleeve-side insertion hole 19b1. In order to securely hold the sleeve 12 by the sleeve-side insertion hole 19b1, the central angle θ is preferably set to less than 180 degrees. Furthermore, since the notch 19d is connected to the circumference 19b2 of the sleeve-side insertion hole 19b1 at points P1 and P2, sharp edges form at the points P1 and P2, and deformation or loss may occur at the time of assembly. Therefore, in order to eliminate sharp edges, the central angle θ is preferably set to greater than or equal to 90 degrees.

As described above, when generating the attraction force F that matches the maximum value Fmax, the length L may be greater than or equal to the predetermined length Ld. Therefore, the range of the ratio (L/W) of the distance L with respect to the width W can be expressed by the following equation 2.

$$L/W \geq 0.12\theta+0.17 \qquad \text{Equation 2}$$

Figure 6:
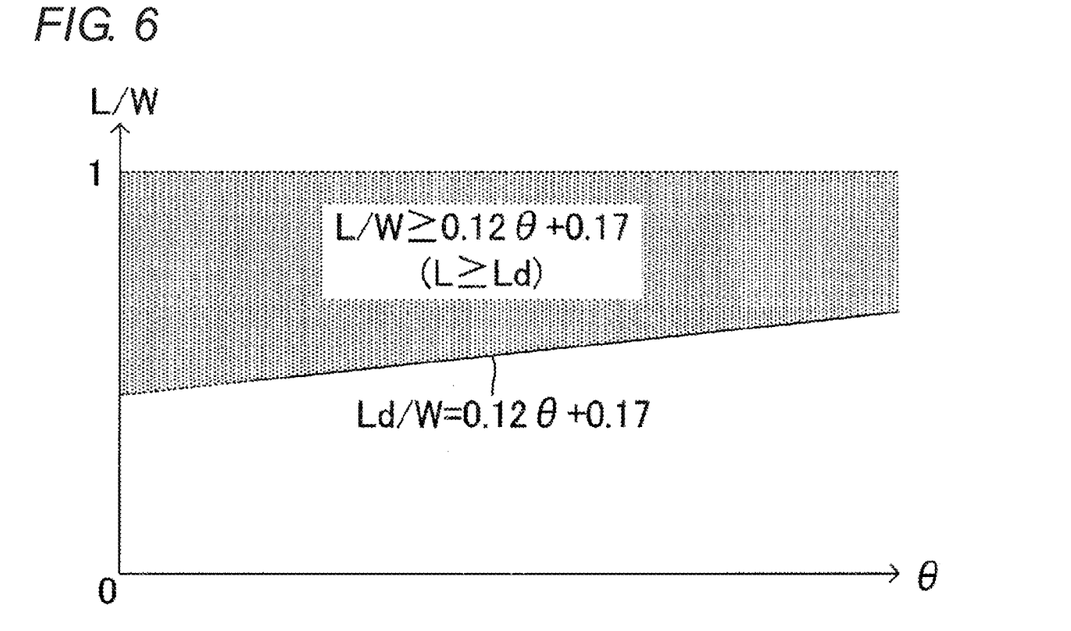
FIG. 6 is a view showing a relationship between a central angle in an insertion hole and a ratio of width and length.

When Equation 2 is satisfied, the ratio (L/W) exists in the region indicated by the satin finish in FIG. 6. Therefore, by setting the width W and the length L and forming the notch 19d so that the ratio (L/W) exists in the region shown in FIG. 6, the yoke 19 acts an attraction force F that matches the maximum value Fmax on the plunger 15 when the coil 18 is energized.

As can be understood from the above description, the electromagnetic valve 10 of the embodiment described above is an electromagnetic valve including a tubular sleeve 12, a tubular valve body 13 with an inflow hole 13c liquid-tightly fixed at one end side of the sleeve 12 and through which the fluid flow in and an outflow hole 13b through which the fluid flows out, a stator 14 liquid-tightly fixed at the other end side of the sleeve 12, a plunger 15 serving as a movable element that is arranged between the stator 14 and the valve body 13 inside the sleeve 12 and that moves along the axis Jo of the sleeve 12, a spring S serving as an urging member that urges the plunger 15 along the axis Jo, a seat member 16 that is fixed inside the valve body 13 and that includes a valve seat 16a and a valve hole 16b communicating with the valve seat 16a, a valve element 17 that moves along the axis Jo integrally with the plunger 15 to be seated and separated with respect to the valve seat 16a, a coil 18 provided on the outer periphery of the sleeve 12, and a yoke 19 with a first stator-side insertion hole 19a1 serving as a first insertion hole for inserting the stator 14 and a sleeve-side insertion hole 19b1 serving as a second insertion hole coaxial with the stator-side insertion hole 19a1 for inserting the sleeve 12, the yoke 19 being provided to surround the coil 18 and to form a magnetic circuit together with the stator 14 and the plunger 15 when the coil 18 is energized.

In the electromagnetic valve 10, the yoke 19 includes a notch 19d formed by being notched and extended to the outside of the circumference 19b2 from two points P1 and P2 on the circumference 19b2 forming the sleeve-side insertion hole 19b1, which is at least one insertion hole of the stator-side insertion hole 19a1 and the sleeve-side insertion hole 19b1, and that has a minimum distance between the point P1 and the point P2 as the width W and a distance from the straight line connecting the point P1 and the point P2 in a direction orthogonal to the straight line as the length L, where when the coil 18 is energized, the width W of the notch 19d is set based on a maximum value Fmax serving as the target attraction force Fd of the attraction force F for attracting the plunger 15 toward the inner peripheral surface 12a of the sleeve 12 with the valve element 17 in a direction opposite to the position where the notch 19d is formed with respect to the axis Jo, and the length L of the notch 19d is set so as to be greater than or equal to a predetermined length Ld at which the attraction force F that increases as the length L increases in the set width W becomes constant at the maximum value Fmax regardless of the increase in the length L.

Thus, the width W of the notch 19d can be determined according to the target attraction force Fd required when attracting the plunger 15 toward the inner peripheral surface 12a of the sleeve 12, and the length L of the notch 19d can be determined to be greater than or equal to a predetermined length Ld which is determined according to the determined width W. Furthermore, as the notch 19d having the determined width W and length L is formed in the yoke 19 together with the sleeve-side insertion hole 19b1, the attraction force F that reliably matches the target attraction force Fd can be generated when the coil 18 is energized, and the outer peripheral surface 15a of the plunger 15 is pressed against the inner peripheral surface 12a of the sleeve 12. Therefore, when the electromagnetic valve 10 is operated in accordance with the energization of the coil 18, for example, the generation of self-excited vibration of the plunger 15 and the valve element 17 due to the fluid force of the fluid flowing in and out can be satisfactorily suppressed, and the generation of abnormal noise when the electromagnetic valve 10 is operated can be greatly reduced.

Furthermore, as the width W increases, the target attraction force Fd (maximum value Fmax) increases, and the attraction force F that matches the maximum value Fmax can be generated when the length L is greater than or equal to the predetermined length Ld. Thus, when forming the notch 19d in the yoke 19, it is not necessary to notch the determined width W and length L with high processing accuracy and dimensional accuracy, and the processing accuracy and dimensional accuracy can be appropriately reduced. Therefore, the processing cost of the yoke 19 (notch 19d) can be reduced, the yield of the yoke 19 can be improved, and the manufacturing cost of the electromagnetic valve 10 can be reduced.

In this case, in the notch 19d, the width W and the length L are set using a central angle θ formed by a center point O of the sleeve-side insertion hole 19b1 and a straight line connecting each of the points P1 and P2 in relation to the width W, so that the ratio (L/W) of the length L with respect to the width W satisfies L/W≥0.12θ+0.17 shown as Equation 2 above.

Therefore, by setting the width W and the length L of the notch 19d so as to satisfy the relationship expressed by Equation 2, the yoke 19 can reliably generate the attraction force F (target attraction force Fd) for attracting the plunger 15 toward the inner peripheral surface 12a of the sleeve 12. Therefore, the generation of self-excited vibration of the plunger 15 and the valve element 17 can be satisfactorily suppressed, and the generation of abnormal noise when the electromagnetic valve 10 is operated can be greatly reduced.

In these cases, the notch 19d is provided on the sleeve-side insertion hole 19b1, which is the side proximate to the valve element 17 accommodated inside the sleeve 12 in a state in which the sleeve 12 is inserted, of the stator-side insertion hole 19a1 and the sleeve-side insertion hole 19b1.

In the electromagnetic valve 10, when fluid flows in and out, the plunger 15 and the valve element 17 easily vibrate (self-excited vibration) in a radial direction with the stator 14 side, that is, the position where the stopper pin SP and the plunger 15 are abutted as the center. For this reason, in the plunger 15, the amplitude on the valve element 17 side is likely to increase, and as a result, abnormal noise is generated when the electromagnetic valve 10 is operated. On the other hand, in the yoke 19 of the present embodiment, the notch 19d can be provided in the sleeve-side insertion hole 19b1, and hence the attraction force F (target attraction force Fd) can be easily acted on the valve element 17 side of the plunger 15, that is, the side in which the amplitude tends to increase. As a result, the outer peripheral surface 15a of the plunger 15 on the valve element 17 side of the plunger 15 is pressed against the inner peripheral surface 12a of the sleeve 12, so that the generation of self-excited vibration can be effectively suppressed. Therefore, generation of abnormal noise when the electromagnetic valve 10 is operated can be effectively reduced.

Furthermore, in these cases, the yoke 19 is configured by a plate-shaped first member 19a having a stator-side insertion hole 19a1, a plate-shaped second member 19b having a sleeve-side insertion hole 19b1, and a third member 19c that is parallel to the axis Jo and that connects a part of the first member 19a and a part of the second member 19b, where the notch 19d is provided on a side opposite to the third member 19c with respect to the axis Jo.

Accordingly, in the yoke 19, the notch 19d can be provided at a position separated from the third member 19c. Thus, when forming the notch 19d, when adjusting the width W and the length L of the notch 19d according to the attraction force F (target attraction force Fd), and the like, work can be performed without interfering with the third member 19c. Therefore, the yoke 19 and thus the electromagnetic valve 10 can be easily manufactured.

Modified Example

Figure 7:
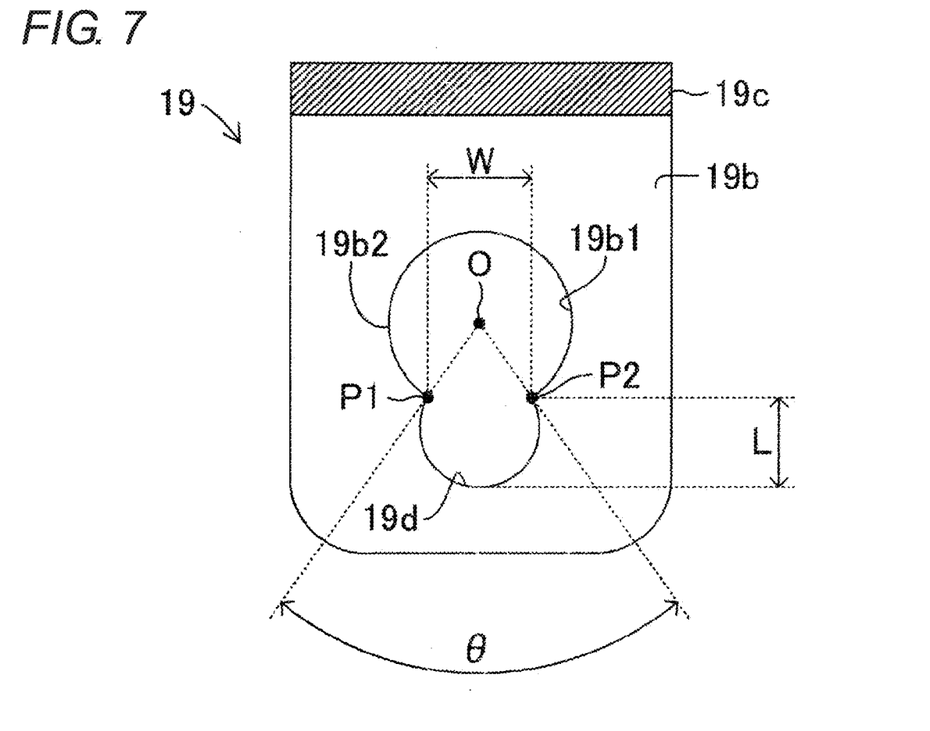
FIG. 7 is a partial cross-sectional view showing a configuration of a notch according to a modified example of the embodiment.

In the embodiment described above, the rectangular notch 19d is formed in the sleeve-side insertion hole 19b1 of the second member 19b of the yoke 19. Alternatively, as shown in FIG. 7, the shape of the notch 19d can be formed in an arc shape. Furthermore, in the embodiment described above, the notch 19d is formed so that the sides extending in the direction of the length L are parallel to each other. Alternatively, the notch 19d can be formed so that the sides extending in the direction of the length L form an angle with each other.

Although the electromagnetic valve 10 in the above embodiment is a normally-closed type electromagnetic valve, it can also be applied to a normally-open type electromagnetic valve. In this case, the spring S is, for example, assembled in a compressed state between the other end of the plunger 15 (the lower side in the vertical direction in FIG. 1) and a convex portion (partition wall etc.) provided on the inner peripheral surface of the valve body 13.

Even when the electromagnetic valve 10 is a normally-open type electromagnetic valve, the yoke 19 includes the notch 19d to act an attraction force F that matches the target attraction force Fd on the plunger 15 so that the outer peripheral surface 15a of the plunger 15 is pressed against the inner peripheral surface 12a of the sleeve 12, and thus the vibration (self-excited vibration) generated due to the fluid force of the fluid immediately before the distal end portion 17b of the valve element 17 is seated on the valve seat 16a or the like when the coil 18 is energized can be effectively suppressed. Therefore, even if the electromagnetic valve 10 is a normally-open type electromagnetic valve, the same effects as in the above embodiment can be obtained. In the case of a normally-open type electromagnetic valve, the valve element 17 can be aligned with respect to the valve seat 16a by the distal end portion 17b of the valve element 17 seating on the valve seat 16a.

The electromagnetic valve 10 described in the above embodiment can be applied to, for example, an electromagnetic valve forming a brake control system of a vehicle. Hereinafter, a brake control system to which the electromagnetic valve 10 can be applied will be briefly described with reference to FIG. 8.

Figure 8:
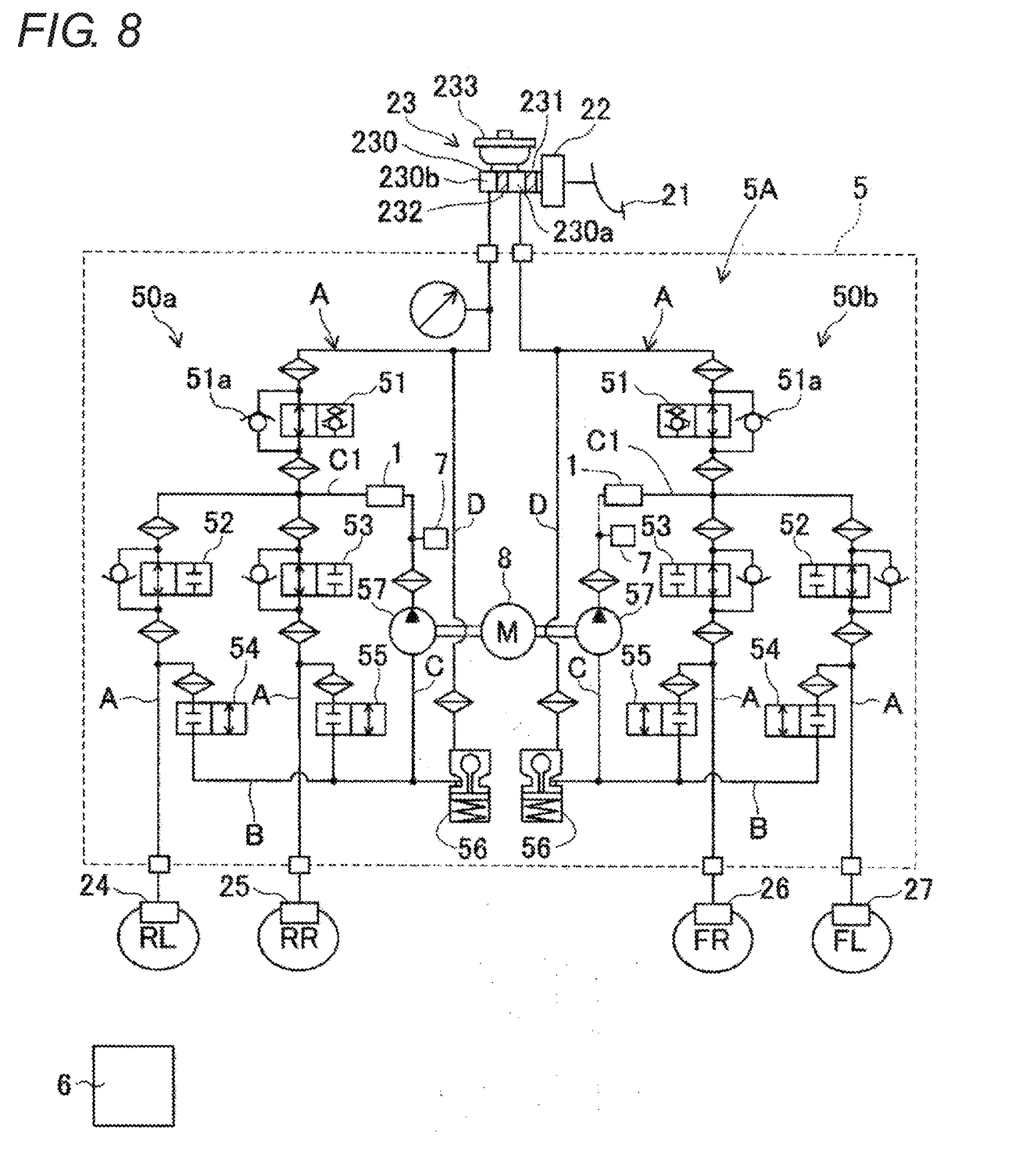
FIG. 8 is a configuration view showing a configuration of a hydraulic pressure control device of a brake device to which an electromagnetic valve is applied.

In the brake control system, the electromagnetic valve 10 is incorporated in an actuator 5. The brake control system includes, as a cylinder mechanism 23, a master cylinder (M/C) 230, master pistons 231 and 232, and a master reservoir 233. The wheel cylinders 24, 25, 26, and 27 are disposed on the left rear wheel RL, the right rear wheel RR, the left front wheel FL, and the right front wheel FR, respectively, to apply a braking force.

In the brake control system, when the driver depresses a brake operation member 21, the depressing force is boosted by a booster device 22, and the master pistons 231 and 232 in the master cylinder 230 are pressed. Thus, the same master cylinder pressure is generated in the first master chamber 230a and the second master chamber 230b. The master cylinder pressure is transmitted to the wheel cylinders 24 to 27 through the actuator 5.

The actuator 5 is a device that controls the wheel pressure of the wheel cylinders 24 to 27 according to an instruction from the brake control device 6. Specifically, as shown in FIG. 8, the actuator 5 includes a hydraulic circuit 50. The hydraulic circuit 50 has a first piping system 50a and a second piping system 50b. The first piping system 50a is a system that controls the wheel pressure applied to the left rear wheel RL and the right rear wheel RR. The second piping system 50b is a system that controls the wheel pressure applied to the left front wheel FL and the right front wheel FR. Since the basic configurations of the first piping system 50a and the second piping system 50b are the same, the first piping system 50a will be described below, and the description of the second piping system 50b will be omitted.

The first piping system 50a includes a main line A, a differential pressure control valve 51 and a check valve 51a, pressure increasing valves 52 and 53, a pressure reducing line B, pressure reducing valves 54 and 55, a pressure adjusting reservoir 56, a reflux line C, and an auxiliary line D, which are controlled by the brake control device 6, so that so-called automatic brake control and side slip prevention control can be performed. In this case, the electromagnetic valve 10 (including the normally-open type electromagnetic valve) shown in the above embodiment can be applied to each of the differential pressure control valve 51, the pressure increasing valves 52, 53, and the pressure reducing valves 54, 55. The reflux line C includes a discharge-side passage C1 that connects the discharge port of the pump 57 driven by the motor 8 and the main line A. The discharge-side passage C1 is provided with a damper 7 for absorbing the discharge pulsation of the pump 57, and a check valve 1 between the damper 7 and the main line A.

When the above-described electromagnetic valve 10 is applied to the differential pressure control valve 51, the pressure increasing valves 52, 53, and the pressure reducing valves 54, 55 of the vehicle brake control system, for example, it is conceivable that the opening/closing operation frequency of the electromagnetic valve 10 increases accompanying the automatic brake control and the side slip prevention control. When the opening/closing operation frequency of the electromagnetic valve 10 increases, self-excited vibration is easily generated in the plunger 15 and the valve element 17, and the possibility that the electromagnetic valve 10 generates abnormal noise increases.

However, the electromagnetic valve 10 includes the yoke 19 having the notch 19d, and the attraction force F that matches the target attraction force Fd can be generated as described above. Therefore, even when the electromagnetic valve 10 is applied to a vehicle brake control system (hydraulic pressure control device) including the electromagnetic valve that is provided on a hydraulic path connecting the master cylinder 230 and the wheel cylinders 24 to 27 and that communicates or shuts off the master cylinder 230 and the wheel cylinders 24 to 27, the self-excited vibration of the plunger 15 and the valve element 17 can be suppressed and the generation of abnormal noise when the electromagnetic valve 10 is operated can be effectively suppressed.

Upon implementing the present invention, the above embodiment and the above modified examples are not the sole cases, and various modifications are possible without departing from the object of the present invention.

For example, in the above embodiment and the above modified examples, the notch 19d is provided in the sleeve-side insertion hole 19b1 (i.e., second member 19b of the yoke 19) which is the side proximate to the valve element 17 of the stator-side insertion hole 19a1 and the sleeve-side insertion hole 19b1. Alternatively or additionally, the notch 19d can be provided in the stator-side insertion hole 19a1 (i.e., first member 19a of the yoke 19). When the notch 19d is provided in the stator-side insertion hole 19a1, an attraction force F that matches the target attraction force Fd can be generated on the stator 14 side of the plunger 15, and as a result, the outer peripheral surface 15a of the plunger 15 is pressed against the inner peripheral surface 12a of the sleeve 12.

Furthermore, when the notch 19d is provided in both the stator-side insertion hole 19a1 and the sleeve-side insertion hole 19b1, the attraction force F that matches the target attraction force Fd can be generated on the stator 14 side of the plunger 15 and the valve element 17 side, and the outer peripheral surface 15a of the plunger 15 is pressed against the inner peripheral surface 12a of the sleeve 12. In this case, since the plunger 15 is pressed against the inner peripheral surface 12a of the sleeve 12 without being inclined with respect to the axis Jo, the generation of vibration (self-excited vibration) can be suppressed.

The invention claimed is:

1. An electromagnetic valve comprising:
a tubular sleeve;
a tubular valve body with an inflow hole through which a fluid flows in and an outflow hole through which the fluid flows out, the valve body being liquid-tightly fixed at one end side of the sleeve;
a stator liquid-tightly fixed at another end side of the sleeve;
a movable element that is arranged between the stator and the valve body inside the sleeve and that moves along an axis of the sleeve;
an urging member that urges the movable element along the axis;
a seat member that is fixed inside the valve body and that includes a valve seat and a valve hole communicating with the valve seat;
a valve element that moves along the axis integrally with the movable element to be seated and separated with respect to the valve seat;
a coil provided on an outer periphery of the sleeve; and
a yoke with a first insertion hole for inserting the stator and a second insertion hole coaxial with the first insertion hole for inserting the sleeve, the yoke being provided to surround the coil and to form a magnetic circuit together with the stator and the movable element when the coil is energized,
wherein:
the yoke includes a notch formed by being notched to an outside of a circumference from two points on the circumference forming one of the first insertion hole or the second insertion hole, and that has a minimum distance between the two points as a width and a distance from a straight line connecting the two points in a direction orthogonal to the straight line as a length;

the width of the notch is set based on a target attraction force of an attraction force for attracting the movable element toward an inner peripheral surface of the sleeve with the valve element in a direction opposite to a position where the notch is formed with respect to the axis when the coil is energized; and the notch is provided in the one of the first insertion hole or the second insertion hole that is on a side proximate to the valve element accommodated inside the sleeve in a state in which the sleeve is inserted.

2. The electromagnetic valve according to claim 1, wherein in the notch, the width and the length are set so that a ratio L/W representing a ratio of the length with respect to the width satisfies, $$L/W \geq 0.12\theta + 0.17$$

where W is the width, L is the length, and θ is a central angle formed by a center point of the one of the first insertion hole or second insertion hole and a straight line connecting each of the two points in relation to the width.

3. The electromagnetic valve according to claim 1, wherein:

the yoke is configured by a plate-shaped first member having the first insertion hole, a plate-shaped second member having the second insertion hole, and a third member that is parallel to the axis and that connects a part of the plate-shaped first member and a part of the plate-shaped second member; and the notch is provided on a side opposite to the third member with respect to the axis.

4. An electromagnetic valve comprising:

a tubular sleeve;

a tubular valve body with an inflow hole through which a fluid flows in and an outflow hole through which the fluid flows out, the valve body being liquid-tightly fixed at one end side of the sleeve;

a stator liquid-tightly fixed at another end side of the sleeve;

a movable element that is arranged between the stator and the valve body inside the sleeve and that moves along an axis of the sleeve;

an urging member that urges the movable element along the axis;

a seat member that is fixed inside the valve body and that includes a valve seat and a valve hole communicating with the valve seat;

a valve element that moves along the axis integrally with the movable element to be seated and separated with respect to the valve seat;

a coil provided on an outer periphery of the sleeve; and a yoke with a first insertion hole for inserting the stator and a second insertion hole coaxial with the first insertion hole for inserting the sleeve, the yoke being provided to surround the coil and to form a magnetic circuit together with the stator and the movable element when the coil is energized, wherein:

the yoke includes a notch formed by being notched to an outside of a circumference from two points on the circumference forming one of the first insertion hole or the second insertion hole, and that has a minimum distance between the two points as a width and a distance from a straight line connecting the two points in a direction orthogonal to the straight line as a length;

in the notch, width and length are set so that a ratio L/W representing a ratio of the length with respect to the width satisfies, $$L/W \geq 0.12\theta + 0.17$$

where W is the width, L is the length, and θ is a central angle formed by a center point of the one of the first insertion hole or second insertion hole and a straight line connecting each of the two points in relation to the width; and the notch is provided in the one of the first insertion hole or the second hole that is on a side proximate to the valve element accommodated inside the sleeve in a state in which the sleeve is inserted.

5. An electromagnetic valve comprising:

a tubular sleeve;

a tubular valve body through which a fluid flows in and an outflow hole through which the fluid flows out, the valve body being liquid-tightly fixed at one end side of the sleeve;

a stator liquid-tightly fixed at another end side of the sleeve;

a movable element that is arranged between the stator and the valve body inside the sleeve and that moves along an axis of the sleeve;

an urging member that urges the movable element along the axis;

a seat member that is fixed inside the valve body and that includes a valve seat and a valve hole communicating with the valve seat;

a valve element that moves along the axis integrally with the movable element to be seated and separated with respect to the valve seat;

a coil provided on an outer periphery of the sleeve; and a yoke with a first insertion hole for inserting the stator and a second insertion hole coaxial with the first insertion hole for inserting the sleeve, the yoke being provided to surround the coil and to form a magnetic circuit together with the stator and the movable element when the coil is energized;

wherein:

the yoke includes a notch formed by being notched to an outside of a circumference from two points on the circumference forming one of the first insertion hole or the second insertion hole, and that has a minimum distance between the two points as a width and a distance from a straight line connecting the two points in a direction orthogonal to the straight line as a length; and the notch is provided in the one of the first insertion hole or the second hole that is on a side proximate to the valve element accommodated inside the sleeve in a state in which the sleeve is inserted.

6. The electromagnetic valve according to claim 2, wherein:

the yoke is configured by a plate-shaped first member having the first insertion hole, a plate-shaped second member having the second insertion hole, and a third member that is parallel to the axis and that connects a part of the plate-shaped first member and a part of the plate-shaped second member; and the notch is provided on a side opposite to the third member with respect to the axis.

* * * * *